_United States Patent Office_

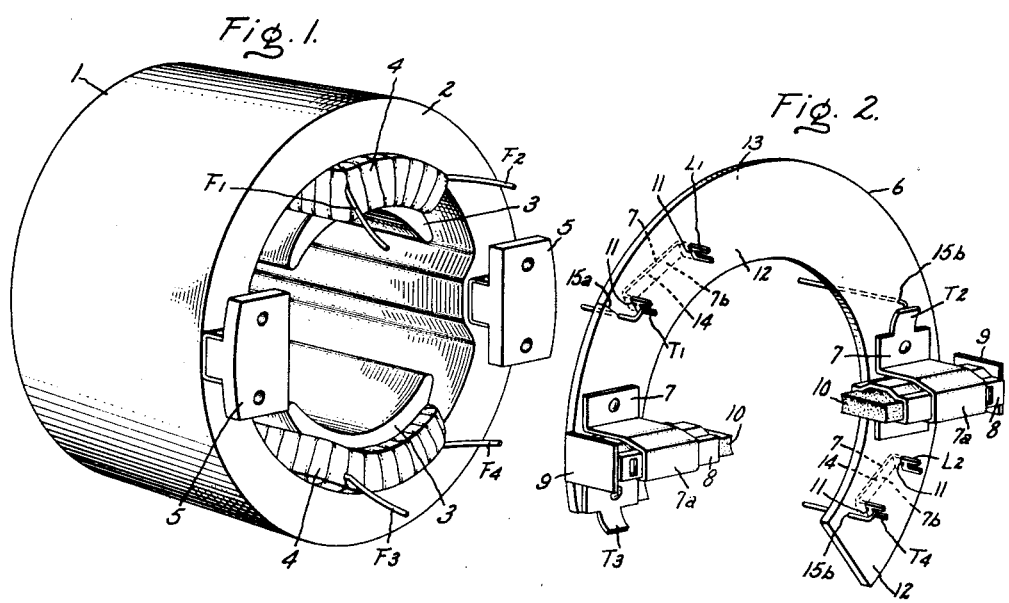

2,947,895
Patented Aug. 2, 1960

2,947,895

BRUSHGEAR ASSEMBLY

Edward John Wray, Barrie, Ontario, Canada, assignor to Canadian General Electric Company, Limited, Toronto, Ontario, Canada, a corporation of Canada Filed Nov. 23, 1956, Ser. No. 623,938

5 Claims. (Cl. 310—239)

This invention relates to improved brushgear assemblies and more particularly to improved means for maintaining electrical brushes and lead terminals in their desired locations with respect to the field poles of small dynamoelectric machines.

It will be understood that the term "brushgear" is intended to cover all components associated with the mechanical and electrical operation of electrical brushes and includes brush holders, brush springs, brush holder closure caps, brush holder supporting and positioning means and any electrical terminals and terminal straps etc. attached to said supporting and/or positioning means.

The small motors employed in domestic appliances such as floor polishers, vacuum cleaners, etc., are customarily of the "Universal" type, since such motors are not only operable on either A.C. or D.C. supplies, but also exhibit a high starting torque. A high starting torque is of course necessary as such appliances are normally started under load. As the "Universal" motor is essentially a D.C. series motor it employs a commutator with associated brushes riding thereagainst. Various means have been employed for maintaining such brushes in proper contact with the commutator, while at the same time ensuring that brush orientation with respect to the field poles is such that sparkless commutation results.

One such prior brush support system has been to form the brush holders integral with the machine casing. This of course results in a more expensive casing since the brush holders must be cast, welded, or machined thereon. Additionally each stator core has had to be individually oriented within its casing during assembly to ensure that its field poles are in correct angular alignment with respect to the brush holders. As the assembled core must be firmly held in the casing, as by frictional engagement therewith or by bolts, welds, etc., this orientation is an awkward and time consuming operation to perform and is thus not desirable where mass production of such machines is contemplated.

Another brush support system formerly employed has been to first assemble the stator core in its casing and to add the brush holders later, as by attachment to the core or casing. This is obviously preferable to the aforementioned method since the brush holders are compact and easily handled and it is therefore comparatively easy to adjust them into their correct positions and there attach them. However the brush holders employed with this type of system have often been supplied individually. This is somewhat inconvenient since the holders must in any case be aligned as a pair and it would simplify brush alignment techniques if a pair of brush holders were supplied as a single unit. Something similar to this has been done on larger machines where a brush holder support ring has been used to carry all brushes in correct alignment with respect to one another, but such support rings are generally of a massive and uneconomical steel plate construction which is not adaptable to smaller machines. So far as is known no satisfactory and economical construction has been evolved which will enable mounting of a pair of brush holders as a single unit on the smaller, fractional horsepower machines.

It is also desirable that each individual brush holder be identical in shape so that there will be no necessity to manufacture both "left-hand" and "right-hand" brush holders (i.e. brush holders which are a "mirror-image" of one another) but only a single standardized brush holder.

A further objection to previously employed brushgear assemblies is that the armature (i.e. brush) terminals, the field terminals, and/or the line terminals have generally been remotely situated from the field windings. This has necessitated the use of long field leads to connect field windings to the said brush terminals, field terminals, or line terminals.

Canadian Standards Associaion (C.S.A.) specifications however, call for flexible field leads (flexible means "bendable without possibility of damage thereto") whereas field windings presently employed generally consist of varnished or enamelled wire which is "flexible" only at the risk of chipping or cracking of said insulating enamel. Hence the only way to provide the long field leads necessitated by the machine construction (while simultaneously complying with C.S.A. regulations) has been to either cover the field leads with a rubber sheath, or else to solder a rubber jacketed lead to the field leads at the point where they leave the field windings. These are time consuming operations and the latter method also is undesirable since it demands that soldering be performed in proximity to the field windings with consequent danger of damaging the insulation thereof due to accidental heating. Furthermore, since rubber jacketed or similarly insulated leads are used as line leads to supply power to the machine it would be desirable from the standpoint of economy and reduced assembly time to dispense with any extra leads internally of the machine. These above factors therefore demand that the armature terminals, the field terminals, and the line terminals be in closest possible proximity to the point where the field leads leave the field windings to enable direct connection thereto.

It will be evident from the foregoing remarks that presently employed brushgear suffers from a number of undesirable features among which is the inconveniently remote location of its armature terminals and/or line terminals, and/or field terminals with respect to the associated field winding leads.

Accordingly the object of my invention is to provide a brushgear assembly which dispenses with or at least reduces a majority of the above mentioned undesirable traits which exist in presently used brushgear.

It is a further object of my invention to provide an improved mounting arrangement for my brushgear and its associated line and field terminals.

It is also an object of my invention to achieve the above objects by means of a brushgear assembly of simple and inexpensive construction which can be supplied as a pre-assembled unit for attachment to a pre-assembled dynamoelectric machine core.

Briefly my invention resides in pre-mounting the brush holders and the armature (i.e. brush) terminals and also the field and line terminals on a mounting cradle to form a unitary brushgear assembly which can be readily attached to the pre-assembled stator core and/or casing. I ensure that said various terminals are so located on said cradle as to coincide closely with the location of their corresponding field leads. Thus the field windings can be attached directly to their associated terminals by leads of negligible length. I achieve this adjacent location of the field leads and their associated terminals by use of terminal straps mounted on said cradle and extending therealong. These terminal straps are used to form the various terminals in addition to acting as electrical connecting members therebetween.

In this disclosure the term "negligible length leads" is intended to mean leads whose unsupported length is not a great multiple of their diameter whereby such leads do not droop perceptibly of their own accord and are thus relatively rigid and substantially inflexible to the touch.

For a more comprehensive appreciation of the aims and objects of my invention, together with its mode of operation, reference should be made to the ensuing description and its associated drawings in which:

Fig. 1 shows the laminated stator core and field windings of a typical small dynamoelectric machine which may advantageously employ my invention;

Fig. 2 shows the unitary brushgear assembly of my invention ready for attachment to the stator core of Fig. 1.

Before proceeding further it should be apparent that my invention is applicable to a variety of commutator type dynamoelectric machines other than those of the series type D.C. which as the preferred embodiments, has been referred to for illustrative purposes in the ensuing description. It should also be apparent that the invention per se may be rearranged or similarly modified to facilitate its use with such other types of machines, without however departing from the basic idea of my invention.

Proceeding then to Fig. 1 there is shown a stator core 1 suitable for insertion in a surrounding casing (not shown), and comprising a stack of laminations each of substantially annular configuration. This lamination configuration is best shown by considering the end 2 of stator core stack 1. Field poles 3 are provided with field windings 4 which are wound on pole 3 and have leads $F_1$, $F_2$ and $F_3$, $F_4$ respectively. Two or more insulated pedestals or seats 5 are attached preferably to the core as shown, or the casing (not shown) by any convenient means. The stator layout as thus far described is fairly typical of contemporary small machines and therefore forms no part of my invention.

My invention is best shown in Fig. 2 as comprising a mounting cradle 6 of electrically insulative material which carries various electrically conductive terminal straps 7 thereon and also a pair of brush holders 8. Cradle 6 is preferably (though not necessarily) a strip of fibreboard of the arcuate form shown. Brush holders 8 are provided with closure caps 9 and brushes 10 and may be retained in position by means of a pair 7a of said straps 7 fastened to cradle 6 by any convenient means. Holders 8 and straps 7 are of an electrically conductive material such that the pair 7a of straps 7 which retain the holders 8 may be extended to form a pair of armature (i.e. brush) terminals $T_2$, $T_3$. In a similar manner terminal straps 7b are used to form other pairs of terminals $L_1$, $T_1$ and $L_2$, $T_4$ respectively. This may be done by bending the ends of said remaining straps 7b and pushing said bent ends through slits 11 in cradle 6 to project from the front face 12 thereof and thus provide the desired terminal pairs $L_1$, $T_1$ and $L_2$, $T_4$. The middle portions 14 of said remaining terminal straps 7b are thus disposed along the rear face 13 of cradle 6 to provide electrical connection between terminals $L_1$ and $T_1$ and between terminals $L_2$ and $T_4$ respectively. It will be seen that the component parts of such a brushgear assembly are sufficiently simple to enable their economical manufacture and rapid assembly.

Brush holders 8 are of the tubular form shown or of any other cross-sectional configuration called for by the form of brushes 10.

The customary brush-biasing spring (not shown) is provided inside holder 8 and holds brush 10 in proper contact with the machine commutator which is carried on a rotor (not shown) rotating inside stator core 1 in the normal manner.

Upon assembly of the machine therefore my unitary brushgear assembly of Fig. 2 is readily maneuvered into the correct angular position with respect to poles 3 such that sparking between brushes 10 and the rotor commutator (not shown) is at a minimum. The assembly of Fig. 2 is then permanently retained in this optimum position by attaching cradle 6 to pedestals 5 in any convenient manner as by adhesives, bonding, etc. or by driving rivets, screws, etc. through cradle 6 (or through cradle 6 and straps 7a) into pedestals 5. Should the operation of correctly aligning the brushes with respect to the field poles be performed prior to insertion of core stack 1 in the casing pedestals 5 would be attached to the stator core 1 as shown rather than to the casing (not shown). Alternatively pedestals 5 may be dispensed with and projections may be formed on cradle 6 for attachment direct to stator core 1, the method of attachment of the cradle 6 to the core 1 forming no part of this invention. It will be seen that terminal $T_1$ is now located closely adjacent field lead $F_1$. Thus $T_1$ can serve as a field terminal and be connected directly to the adjacent field winding by a lead $F_1$ of negligible length. Likewise $T_2$ is also located closely adjacent field lead $F_2$, etc.

C.S.A. specifications are thus complied with as the line leads (not shown) which are connected to line terminals $L_1$, $L_2$ when the machine is in operation, are normally flexible and field leads "F" can be connected directly to their respective terminals "T" so closely as to have no appreciable length. With terminals "T" directly associated with corresponding leads "F" as described it will be evident that the machine is connected for "series" operation with $L_1$, $L_2$ acting as the line leads. These connections may however be suitably modified to permit other than "series" operation if desired, by use of a modified cradle having terminal straps of different configuration with the terminals located in positions other than those shown for "series" operation. These different configurations of the terminal straps will be such as to locate the terminals closely adjacent their appropriate field windings so that the criterion of "negligible field lead length" will still be maintained for connections other than "series." Connection of the field windings to their corresponding terminals can be achieved as by poking leads "F" through lead-anchoring notches 15a or holes 15b in cradle 6 and then soldering said leads "F" direct to their associated terminals "T," or by soldering leads "F" to the middle portions 14 of the straps 7b forming their associated terminals "T" etc. The former method is preferable since cradle 6 then shields field winding 4 from the heat evolved during the soldering operation. Naturally straps 7 need not be of the shapes and locations illustrated, but may be of such lengths, locations and configurations as are required to achieve the desired result, viz., that terminals $T_1$, $T_2$ . . . etc. shall be in close proximity to the corresponding field leads $F_1$, $F_2$ . . . etc. directly associated therewith.

It will be noted that those straps 7a which retain brush holders 8 are identically attached thereto during manufacture, i.e. when looking along either of said holders 8 from closure members 9 towards the projecting brushes 10, the armature terminals $T_2$, $T_3$ always project from the same side of the holder (in this case the right-hand side when looking at core 1 from the end appearing in Fig. 1). Thus each combination of holder 8 and retaining strap 7a is identical whereby production of such items may be standardized at one such combination and the necessity of producing both "left-hand" and "right-hand" combinations (i.e. combinations which are "mirror images" of one another) does not arise.

It will be apparent that I have provided a unitary brushgear assembly of enhanced simplicity, compactness, and durabliity, which permits rapid assembly of readily-serviceable dynamoelectric machines and it is therefore my intention to cover in the appended claims all such equivalencies or modifications as do not depart from the spirit and scope of my invention as outlined herein.

What I claim as new and desire to secure by Letters Patent of the United States is:

1. A dynamoelectric machine with field windings, said windings having leads of negligible length, said leads extending axially, and a brushgear assembly, said brushgear assembly being adapted to be incorporated into said machine as a unit and comprising, a mounting cradle that is adapted to be supported by said machine, said cradle supporting terminal straps and brush holders thereon, said terminal straps being effective to form axially facing armature terminals and field terminals, said armature terminals and field terminals being located closely adjacent to said leads when said cradle is supported on said machine, whereby said terminals may be directly connected to said leads.

2. A dynamoelectric machine with field windings, said windings having leads, said leads extending axially, and a brush-gear assembly, said brushgear assembly being adapted to be incorporated into said machine as a unit and comprising a substantially arcuate mounting cradle that is adapted to be supported by said machine, said cradle supporting terminal straps and brush holders thereon, some of said straps being effective to form axially facing armature terminals and axially facing field terminals, said armature terminals and field terminals being located closely adjacent to said leads of said field windings whereby said leads are of negligible length when said cradle is supported on said machine and said leads are electrically connected to their appropriate terminals.

3. A dynamoelectric machine having field windings, said windings having leads of neglible length, said leads extending axially, and a brushgear assembly, said brushgear assembly being adapted to be incorporated into said machine as a unit and comprising an insulative mounting cradle that is adapted to be supported by said machine and carrying terminal straps and brush holders, said straps being effective to form a plurality of separate axially facing armature, field and line terminals, some of said straps being also effective to fasten said brush holders to said cradle, said armature terminals and field terminals being located on said cradle in positions closely adjacent to the field windings of the machine when said cradle is supported on said machine, whereby any of said field windings may be connected to any desired one of said terminals by said leads.

4. A dynamoelectric machine having brushes contacting a commutator, a stator core provided with poles having field windings thereon, a brushgear assembly fixed to said core, said brushgear assembly being adapted to be incorporated into said machine as a unit and comprising a mounting cradle supporting terminal straps and brush holders thereon, said brushgear assembly being oriented with respect to said poles such that sparkless commutation results at said brushes, axially facing armature terminals and field terminals formed from some of said straps, said armature and field terminals being located closely adjacent to corresponding leads of said field windings for direct separate connection thereto, whereby said leads are of negligible length.

5. A dynamoelectric machine having brushes contacting a commutator, a stator core supporting poles with field windings thereon, said windings having leads of negligible length, a brushgear assembly fixed to said core and oriented with respect to said poles such that sparkless commutation results at said brushes, said brushgear assembly being adapted to be incorporated into said machine as a unit and comprising a mounting cradle with terminal straps and brush holders supported thereon, said cradle comprising a substantially arcuate strip of insulative material having slits therethrough, some of said straps being effective to retain said brush holders on said cradle, others of said straps extending along one face of said cradle between pairs of said slits and having ends projecting through said slits to form axially facing terminals on the opposite face of said cradle, said slits being located such that said terminals are formed in close proximity to their associated field windings, whereby said field windings and their associated terminals may be separately electrically interconnected by said leads of negligible length.

References Cited in the file of this patent

UNITED STATES PATENTS

| | | |
|---|---|---|
| 1,946,957 | Allen | Feb. 13, 1934 |
| 2,195,801 | Thibault | Apr. 2, 1940 |
| 2,444,826 | Happe | July 6, 1948 |
| 2,584,214 | Luther | Feb. 5, 1952 |

FOREIGN PATENTS

| | | |
|---|---|---|
| 168,332 | Great Britain | Apr. 10, 1922 |